(12) United States Patent
Yasukochi

(10) Patent No.: US 8,880,209 B2
(45) Date of Patent: Nov. 4, 2014

(54) 3D MODELING APPARATUS, 3D MODELING METHOD, AND MODELED OBJECT

(75) Inventor: Hiroyuki Yasukochi, Kanagawa (JP)

(73) Assignee: Sony Corporation, Tokyo (JP)

( * ) Notice: Subject to any disclaimer, the term of this patent is extended or adjusted under 35 U.S.C. 154(b) by 365 days.

(21) Appl. No.: 13/272,940

(22) Filed: Oct. 13, 2011

(65) Prior Publication Data

US 2012/0130530 A1 May 24, 2012

(30) Foreign Application Priority Data

Nov. 18, 2010 (JP) ................. 2010-257726

(51) Int. Cl.
*B29C 67/00* (2006.01)

(52) U.S. Cl.
CPC ......... *B29C 67/0066* (2013.01); *B29C 67/0059* (2013.01); *B29K 2995/002* (2013.01)
USPC .............................. 700/98; 700/120; 700/119

(58) Field of Classification Search
None
See application file for complete search history.

(56) References Cited

U.S. PATENT DOCUMENTS

| | | | | |
|---|---|---|---|---|
| 5,006,364 A * | 4/1991 | Fan | ................................ | 427/510 |
| 5,059,266 A * | 10/1991 | Yamane et al. | ................... | 156/64 |
| 5,059,359 A * | 10/1991 | Hull et al. | ...................... | 264/401 |
| 5,094,935 A * | 3/1992 | Vassiliou et al. | .............. | 264/401 |
| 5,104,592 A * | 4/1992 | Hull et al. | ...................... | 264/401 |
| 5,637,175 A * | 6/1997 | Feygin et al. | .................. | 156/264 |
| 5,650,260 A * | 7/1997 | Onishi | ........................... | 430/269 |
| 5,776,409 A * | 7/1998 | Almquist et al. | .............. | 264/401 |
| 5,876,550 A * | 3/1999 | Feygin et al. | .................. | 156/264 |
| 6,305,769 B1 * | 10/2001 | Thayer et al. | ...................... | 347/1 |
| 6,406,658 B1 * | 6/2002 | Manners et al. | ............... | 264/401 |
| 6,612,824 B2 * | 9/2003 | Tochimoto et al. | ........... | 425/130 |
| 6,697,694 B2 * | 2/2004 | Mogensen | ...................... | 700/119 |
| 6,799,959 B1 * | 10/2004 | Tochimoto et al. | ........... | 425/130 |
| 6,868,885 B2 * | 3/2005 | Kakimoto et al. | .............. | 156/379 |
| 6,896,839 B2 * | 5/2005 | Kubo et al. | .................... | 264/460 |
| 6,907,307 B2 * | 6/2005 | Chen et al. | ..................... | 700/119 |

(Continued)

FOREIGN PATENT DOCUMENTS

| | | | | |
|---|---|---|---|---|
| EP | 2199067 A1 * | 6/2010 | ............. | B29C 67/00 |
| JP | 2009-187635 | 8/2009 | | |
| JP | 2009-271954 | 11/2009 | | |

OTHER PUBLICATIONS

McLeod et al., "Three-Dimensional optical disk data storage via the localized alteration of a format hologram", Applied Optics, May 10, 2008, pp. 2696-2707, vol. 47, No. 14.

(Continued)

*Primary Examiner* — Kavita Padmanabhan
*Assistant Examiner* — Christopher E Everett
(74) *Attorney, Agent, or Firm* — K&L Gates LLP

(57) ABSTRACT

A 3D modeling apparatus includes: a support body which supports a modeled object formed by laminating a resin material that is cured by energy of an energy ray; an illumination mechanism which illuminates the resin material with the energy ray, on the basis of image data of laminated cross-sections which constitutes 3D data of an object to be modeled which is an object of modeling, in order to form the modeled object; and a supply mechanism which supplies a material that constitutes a part of the modeled object and is different from the resin material, to the resin material that is cured as being illuminated by the illumination mechanism, on the basis of the cross-section image data.

9 Claims, 12 Drawing Sheets

(56) References Cited

U.S. PATENT DOCUMENTS

| | | | |
|---|---|---|---|
| 6,936,212 B1* | 8/2005 | Crawford | 264/308 |
| 7,033,160 B2* | 4/2006 | Fong | 425/174.4 |
| 7,074,029 B2* | 7/2006 | Stockwell et al. | 425/174.4 |
| 7,104,773 B2* | 9/2006 | Maekawa et al. | 425/174.4 |
| 7,338,556 B2* | 3/2008 | Kim et al. | 118/300 |
| 7,402,273 B2* | 7/2008 | Sherwood | 264/494 |
| 7,670,541 B2* | 3/2010 | Kuzusako et al. | 264/401 |
| 7,833,000 B2* | 11/2010 | Kihara et al. | 425/174.4 |
| 7,845,930 B2* | 12/2010 | Shkolnik et al. | 425/375 |
| 7,862,320 B2* | 1/2011 | Kumagai et al. | 425/174.4 |
| 7,892,474 B2* | 2/2011 | Shkolnik et al. | 264/401 |
| 8,021,139 B2* | 9/2011 | Kumagai et al. | 425/174.4 |
| 8,167,395 B2* | 5/2012 | Fienup et al. | 347/9 |
| 8,348,655 B2* | 1/2013 | Kuzusako et al. | 425/174.4 |
| 8,540,505 B2* | 9/2013 | Farr et al. | 425/375 |
| 8,574,485 B2* | 11/2013 | Kramer et al. | 264/401 |
| 2001/0045678 A1* | 11/2001 | Kubo et al. | 264/37.29 |
| 2001/0050448 A1* | 12/2001 | Kubo et al. | 264/308 |
| 2003/0235635 A1* | 12/2003 | Fong et al. | 425/73 |
| 2005/0001356 A1* | 1/2005 | Tochimoto et al. | 264/308 |
| 2009/0179355 A1* | 7/2009 | Wicker et al. | 264/401 |
| 2009/0267269 A1* | 10/2009 | Lim et al. | 264/401 |
| 2010/0214333 A1* | 8/2010 | Matsui et al. | 347/8 |
| 2010/0228381 A1* | 9/2010 | Matsui et al. | 700/120 |
| 2010/0296374 A1 | 11/2010 | Yamatsu et al. | |
| 2013/0040091 A1* | 2/2013 | Dikovsky et al. | 428/68 |

OTHER PUBLICATIONS

Saito et al., "Analysis of Micro-Reflector 3-D optical disc recording", Proceedings of SPIE, 2007, vol. 6282, 628213.

* cited by examiner

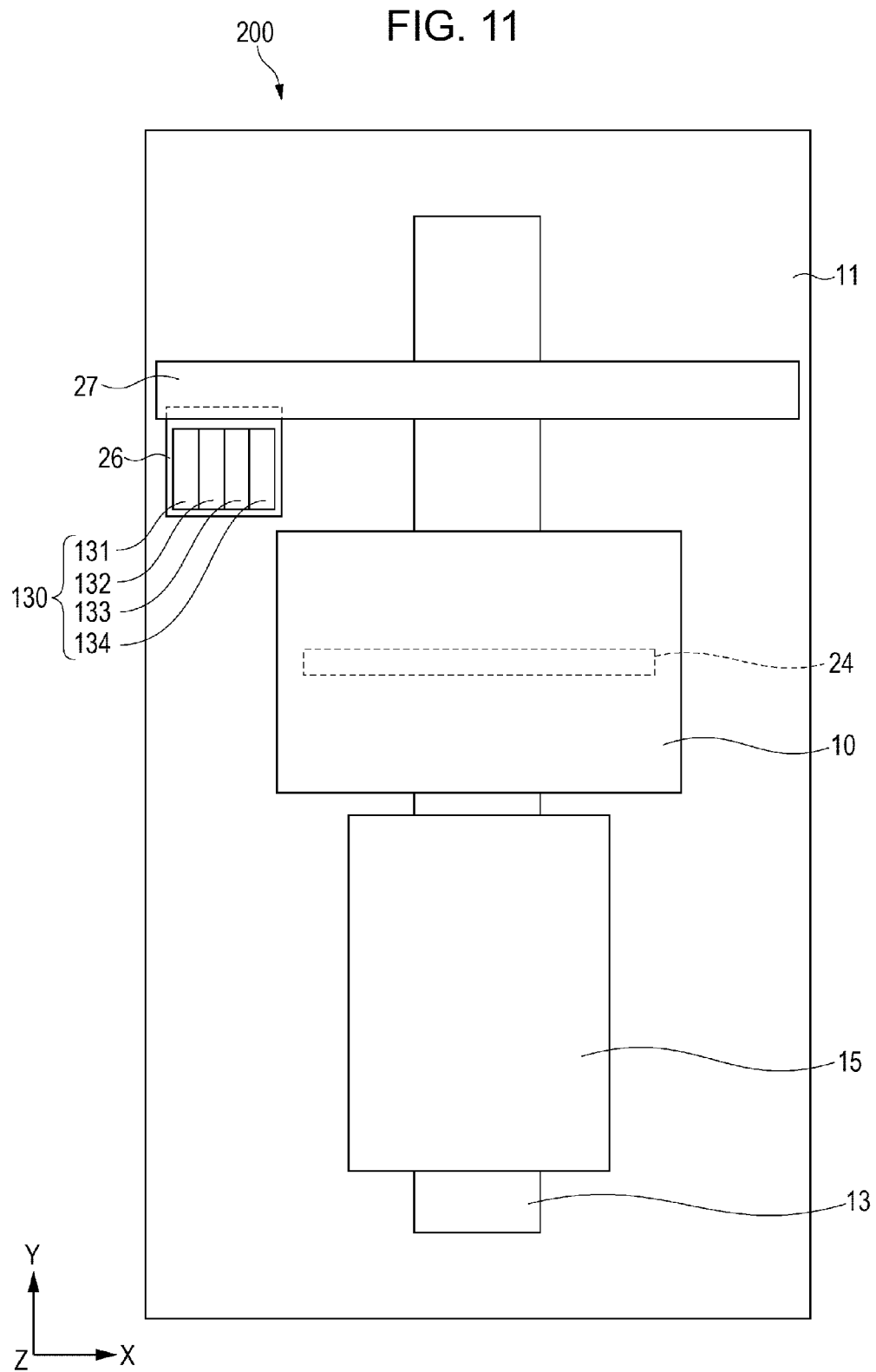

3D MODELING APPARATUS, 3D MODELING METHOD, AND MODELED OBJECT

CROSS REFERENCES TO RELATED APPLICATIONS

The present application claims priority to Japanese Patent Application No. 2010-257726 filed on Nov. 18, 2010, the disclosure of which is incorporated herein by reference

BACKGROUND

The present disclosure relates to a 3D modeling apparatus which forms a 3D object using a material that is cured by illumination of an energy ray such as light, a 3D modeling method, and a modeled object formed by the same.

A modeling apparatus which forms a 3D object is known as a rapid prototyping apparatus and is widely used for work use. In general, a 3D modeling apparatus forms a modeled object layer by layer on the basis of model data of each predetermined thickness of an object to be modeled, that is, model data of each layer.

As one of main methods of the 3D modeling apparatus, for example, an optical modeling method using light as an energy ray is a method of partially and selectively illuminating a photocurable resin with laser light to cure and draw a desired portion of the resin, thereby forming a modeled object.

From among the optical modeling methods, for example, there are a free liquid surface method and a restriction liquid surface method. In the free liquid surface method, the liquid surface of a photocurable resin in a liquid state is exposed in the air and drawing is made by focusing laser light on the interface between the air and the liquid surface. In the restriction liquid surface method, the liquid surface of a photocurable resin in a liquid state is restricted by glass or the like, and drawing is made by focusing light on (the interface between the glass and) the photocurable resin through the glass.

Besides, as an apparatus that forms a modeled object which is colored, there is a 3D modeling apparatus described in Japanese Unexamined Patent Application Publication No. 2000-280356. The 3D modeling apparatus includes an ink jet head that discharges a thermoplastic resin. The ink jet head discharges small droplets of the thermoplastic resin layer by layer according to model data of the cross-section of an object to be modeled. As the discharged thermoplastic resin dissipates heat, cools, and hardens, a modeled object is formed. A colored thermoplastic resin is discharged from discharge nozzles for coloring which are provided in the ink jet head, and a white thermoplastic resin is discharged from discharge nozzles for modeling which are provided in the ink jet head. The thermoplastic resins discharged from the discharge nozzles for coloring and the discharge nozzles for modeling are all used as a material constituting the modeled object, and have a difference in coloring (white is for the base) (for example, refer to paragraphs [0030] to [0033], [0053], and [0061] of Japanese Unexamined Patent Application Publication No. 2000-280356).

SUMMARY

In the 3D modeling apparatus of Japanese Unexamined Patent Application Publication No. 2000-280356, the modeled object is formed of the thermoplastic resin or a photocurable resin (UV ink). Therefore, the thickness of the resin of each of the layers laminated into the modeled object is smaller than 10 μm and is very thin, there is a problem in that a practical speed for the time to form the 3D modeled object may not be obtained.

In addition, there is also a method of using powder as a material constituting a 3D modeled object. However, in a case of the powder, the form of a modeled object becomes coarse compared to the case of using a resin material as described above. That is, there is also a problem in that an effect of high definition is insufficient.

It is desirable to provide a 3D modeling apparatus capable of forming a high-definition modeled object without taking a long time, a 3D modeling method, and a modeled object formed by the same.

A 3D modeling apparatus according to an embodiment of the present disclosure includes a support body, an illumination mechanism, and a supply mechanism.

The support body supports a modeled object formed by laminating a resin material that is cured by energy of an energy ray.

The illumination mechanism illuminates the resin material with the energy ray, on the basis of image data of laminated cross-sections which constitutes 3D data of an object to be modeled which is an object of modeling, in order to form the modeled object.

The supply mechanism supplies a material that constitutes a part of the modeled object and is different from the resin material, to the resin material that is cured as being illuminated by the illumination mechanism, on the basis of the cross-section image data.

Since the material which is a different material from the resin material that is the main material of the modeled object and constitutes a part of the modeled object is supplied, the modeled object can be formed within a short time compared to a case where a modeled body is formed of, for example, UV ink and is then colored like an apparatus according to the related art. In addition, other than a powder material, the resin material that is cured by energy of the energy ray is used as the main constituent material of the modeled object, so that a high-definition modeled object can be formed.

The supply mechanism may have an ink jet head that discharges ink as the material different from the resin material in order to color the modeled object. Accordingly, the modeled object can be colored in monochrome, gray scale, color, or the like.

For example, the resin material is a material that transmits visible light or a white material.

The supply mechanism may supply a functional material having specific properties as the material different from the resin material. Therefore, according to the area of the modeled object, an area having properties such as magnetic properties or conductive properties can be formed.

The supply mechanism may supply the material different from the resin material whenever at least a single layer of the resin material is laminated.

The supply mechanism may alternately supply the material different from the resin material to areas that do not overlap in a laminating direction of the resin material, layer by layer. In this case, the illumination mechanism alternately illuminates the areas that do not overlap in the laminating direction of the resin material with the energy ray layer by layer. Accordingly, energy for use of the energy ray can be saved.

The 3D modeling apparatus may further include a restriction body, a supply nozzle, and a movement mechanism.

The restriction body has a surface including an area having a straight line form along a first direction and is disposed to face the support body so that the area having the straight line form in the surface becomes closest to the support body.

The supply nozzle supplies the resin material to a slit area which is an area between the support body side and the area having the straight line form.

The movement mechanism moves the support body relative to the restriction body along a second direction different from the first direction in order to form a single cured layer of the resin material, and moves the restriction body and the support body relative to each other along the laminating direction in order to laminate the layers of the material cured by the energy ray.

The illumination mechanism illuminates the resin material supplied to the slit area by the supply nozzle, with the energy ray via the restriction body.

Since the restriction body is disposed so that the area having the straight line form of the restriction body becomes closest to the support body, the resin material is cured as the material in the slit area or the area in the vicinity thereof is illuminated with the energy ray. That is, the material in the slit area substantially between the support body side and the area having the straight line form is cured, and the two are moved relative to each other by the movement mechanism so that the surface of the restriction body is separated from the support body on the downstream side of the restriction body. Accordingly, the cured layer of the material can be cleanly peeled off from the restriction body.

In addition, the slit area is formed as the area having the straight line form of the restriction body other than an area having a wide plane shape. Therefore, the material can be easily peeled off from the restriction body as described above. In addition, even though a contractile force generated when the material is cured is exerted on the restriction body, the restriction body is less likely to be distorted or deformed. Accordingly, the flatness of each cured layer can be increased and the thickness of each cured layer can be controlled with high precision.

A 3D modeling method according to another embodiment of the present disclosure includes illuminating a resin material with an energy ray on the basis of image data of laminated cross-sections which constitutes 3D data of an object to be modeled which is an object of modeling, thereby selectively curing the resin material according to an area of the resin material.

A material that constitutes a part of a modeled object and is different from the resin material, is supplied to the resin material cured by the illumination with the energy ray on the basis of the cross-section image data.

Since the material which is a different material from the resin material that is the main material of the modeled object and constitutes a part of the modeled object is supplied, the modeled object can be formed within a short time compared to a case where a modeled body is formed of, for example, UV ink and is then colored like an apparatus according to the related art. In addition, other than a powder material, the resin material that is cured by energy of the energy ray is used as the main constituent material of the modeled object, so that a high-definition modeled object can be formed.

A modeled object according to still another embodiment of the present disclosure is a modeled object formed by the 3D modeling method.

According to the above embodiments of the present disclosure, a high-definition modeled object can be formed without taking a long time.

Additional features and advantages are described herein, and will be apparent from the following Detailed Description and the figures.

BRIEF DESCRIPTION OF THE FIGURES

FIG. 11 is a plan view of the 3D modeling apparatus shown in FIG. 10.

DETAILED DESCRIPTION

Embodiments of the present application will be described below in detail with reference to the drawings.

First Embodiment

Configuration of 3D Modeling Apparatus

Figure 1:
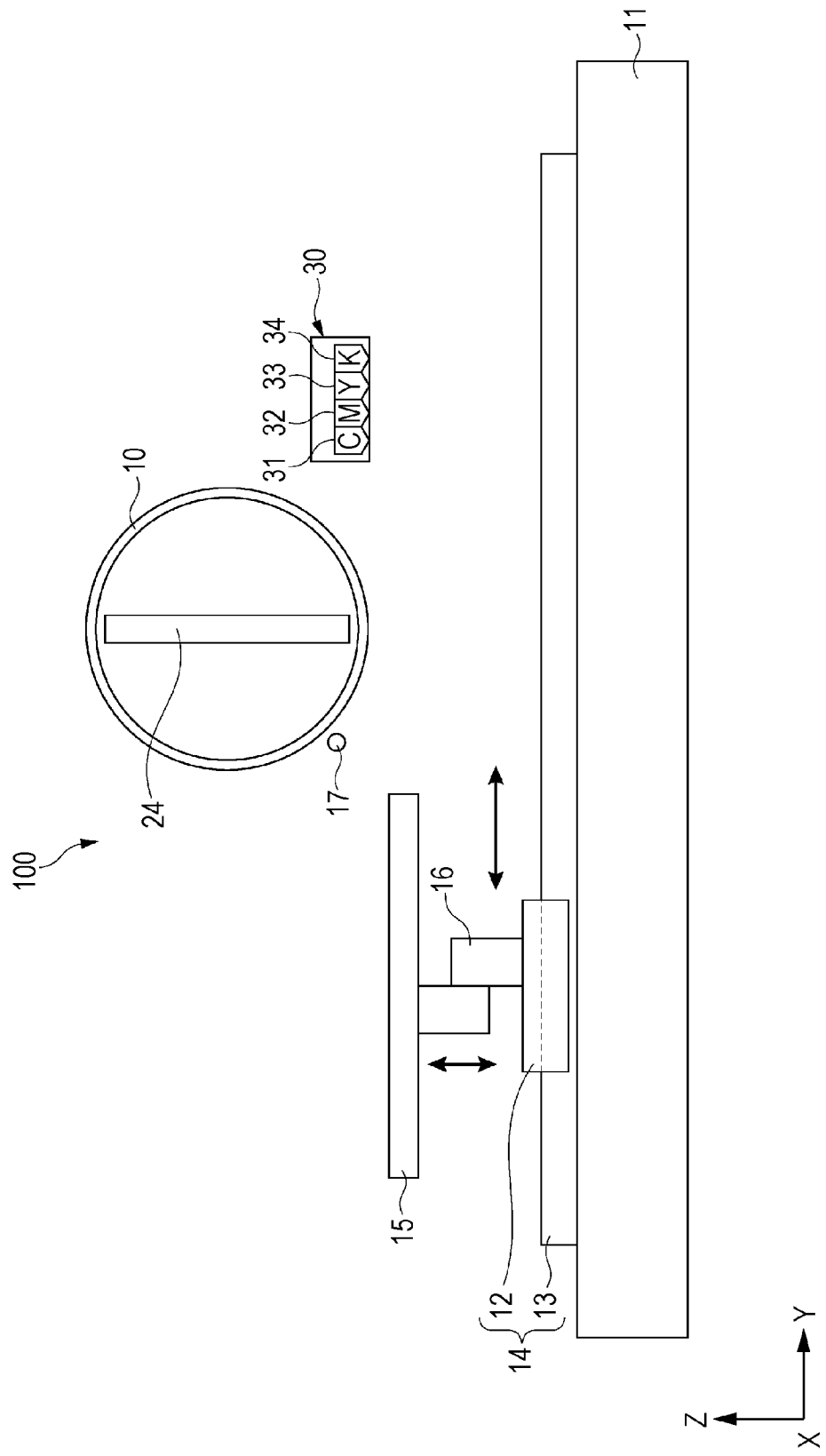
FIG. 1 is a side view showing a 3D modeling apparatus according to a first embodiment of the present disclosure.
Figure 2:
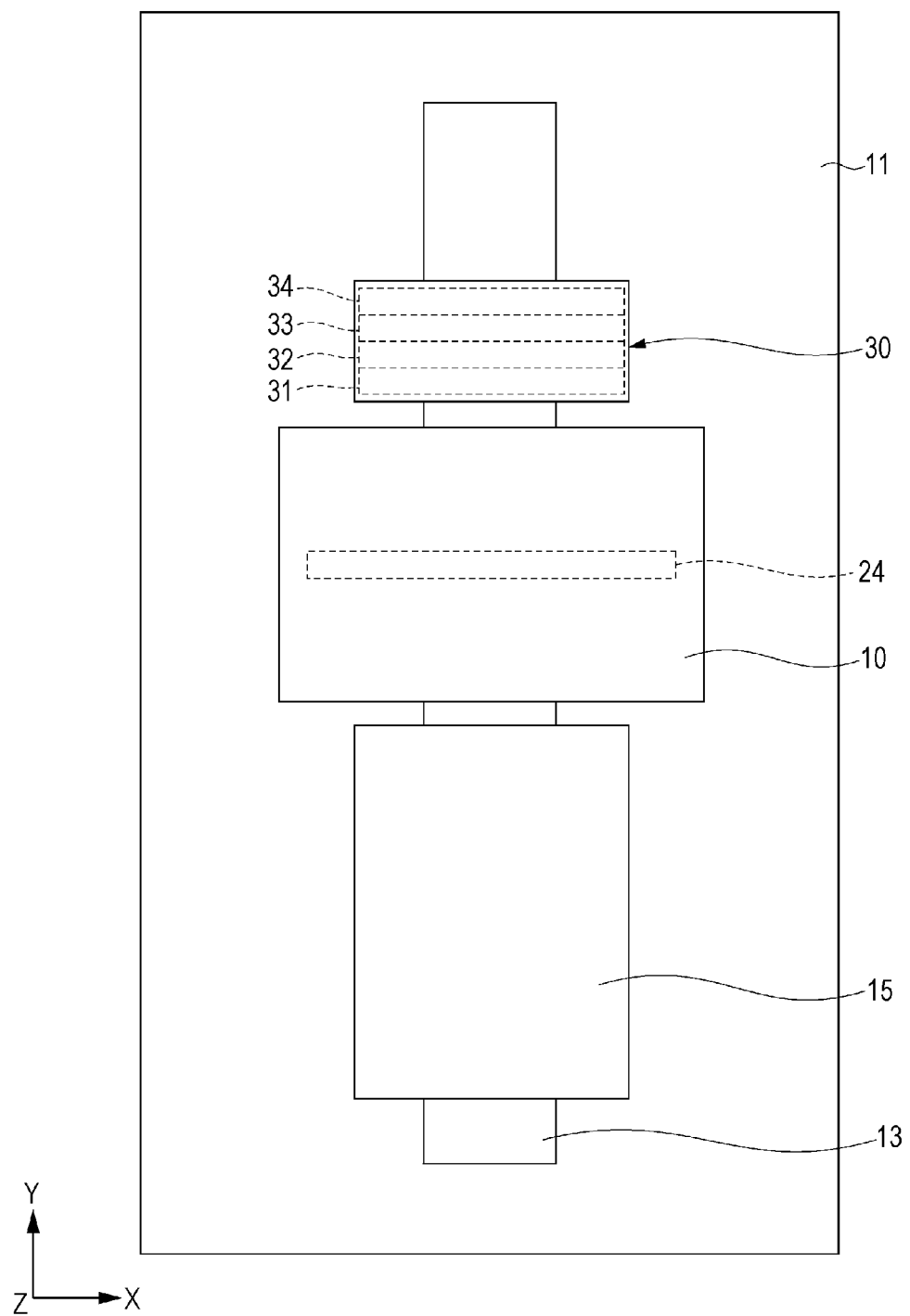
FIG. 2 is a plan view of the 3D modeling apparatus shown in FIG. 1.
Figure 3:
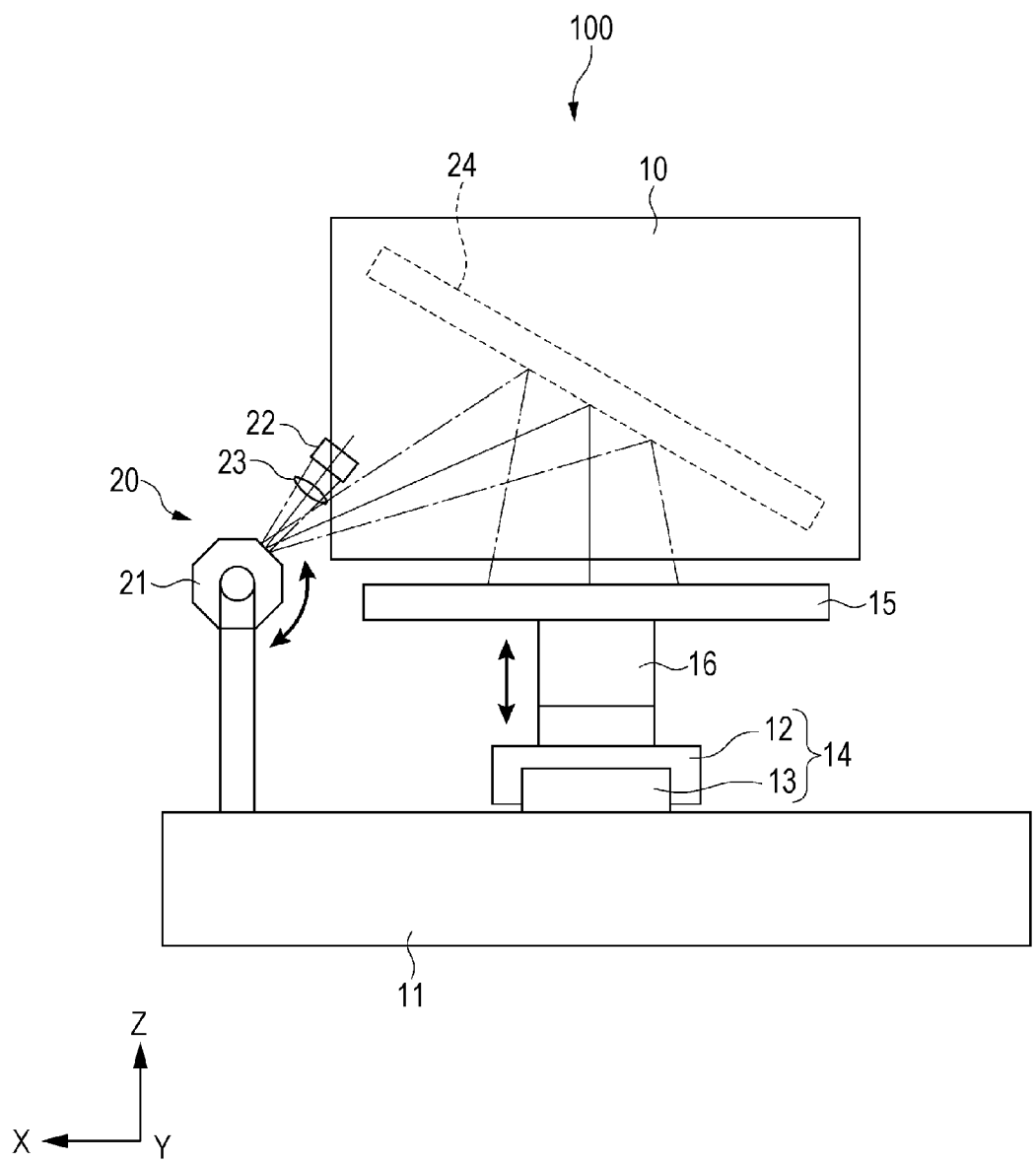
FIG. 3 is a front view of the 3D modeling apparatus.

FIG. 1 is a side view showing a 3D modeling apparatus according to a first embodiment of the present disclosure. FIG. 2 is a plan view of the 3D modeling apparatus 100 shown in FIG. 1, and FIG. 3 is a front view thereof.

The 3D modeling apparatus 100 employs, from among restriction liquid surface methods, a 1D restriction liquid surface method of restricting a liquid surface in a 1D area unlike a method according to the related art in which a liquid surface is restricted in a 2D area.

The 3D modeling apparatus 100 includes a base 11, a modeling stage 15 disposed on the base 11, and a drum 10 disposed to face the modeling stage 15 in the vertical direction (the Z-axis direction). In addition, the 3D modeling apparatus 100 includes a supply nozzle 17 which is disposed below the drum 10 and supplies a resin material to the surface of the drum 10, and an illumination mechanism 20 (see FIG. 3) which illuminates the resin material supplied by the supply nozzle 17 with laser light as an energy ray. As shown in FIGS. 1 and 2, adjacent to the drum 10 in the Y-axis direction, an ink jet head 30 is disposed which discharges color ink onto a cured layer of the resin material constituting a modeled object.

Figure 7:
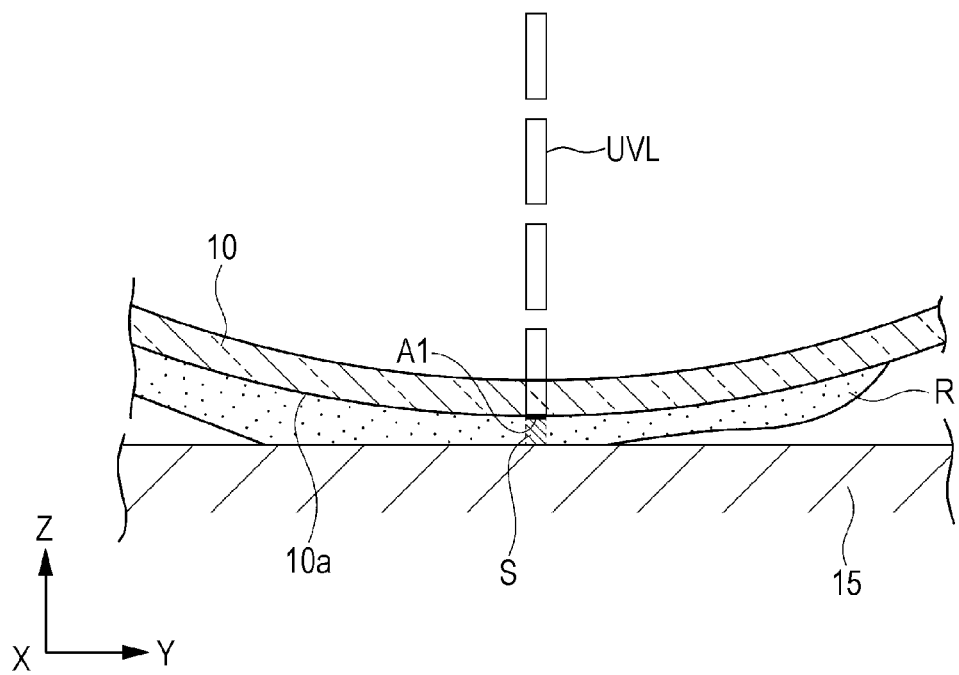
FIG. 7 is a diagram showing a state of a slit area and the vicinity thereof

The drum 10 is formed into a substantially cylindrical form and has a hollow center. The drum 10 has a longitudinal direction disposed along the X-axis direction. As described later, the drum 10 functioning as a restriction body restricts the height (thickness) of the material supplied between the modeling stage 15 and the drum 10 from the supply nozzle 17 in a 1D area as described above. As shown in FIG. 7, the 1D area is an area A1 having a straight line form which may be regarded to be one-dimensional along the longitudinal direction of the drum 10, that is, the X-axis direction.

The drum 10 is formed of, for example, glass, acryl, or other transparent resins. The drum 10 is not necessarily limited to such materials and may employ any material that transmits the energy ray illuminated from the illumination mechanism 20.

Figure 4:
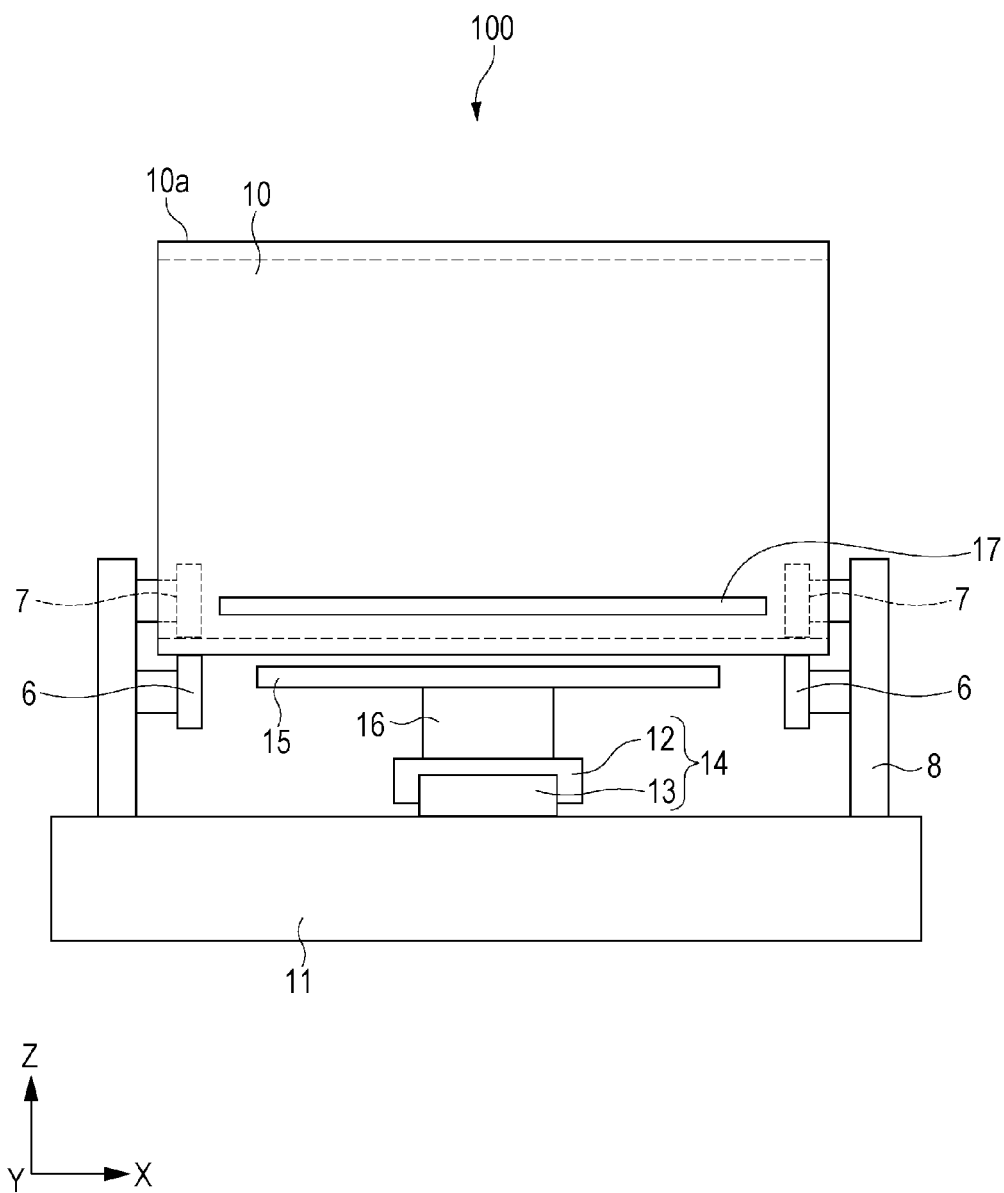
FIG. 4 is a diagram illustrating an example of a mechanism that supports a drum viewed in a direction perpendicular to the longitudinal direction of the drum.

FIG. 4 is a diagram illustrating an example of a mechanism that supports the drum 10 viewed in the Y-axis direction perpendicular to the longitudinal direction of the drum 10.

As shown in FIG. 4, on both sides of the drum 10, a plurality of guide rollers 6 and 7 which support the drum 10 to be rotatable are provided at the periphery thereof in the X-axis. In the figures other than FIG. 4, the guide rollers 6 and 7 are not shown. The guide rollers 6 and 7 are supported by a roller support unit 8 to be rotatable. The guide roller 7 presses downward the inner peripheral surface of the drum 10, and the guide roller 6 supports an outer peripheral surface 10a which is the surface of the drum 10 from the below. For example, a plurality of guide rollers 6 may also be provided in the depth direction viewed in FIG. 4. As such, the drum 10 is supported to be rotatable by being nipped by the guide rollers 6 and 7.

The guide rollers 6 and 7 support the drum 10 at a predetermined height position in the Z-axis direction to form a slit area S (see FIG. 7) described later, between the modeling stage 15 side and the outer peripheral surface 10a of the drum 10. That is, as the surface of the modeling stage 15 faces the area A1 having a straight line form which is the lowest portion of the outer peripheral surface 10a of the drum 10 (a position of the drum 10 closest to the modeling stage 15), the slit area S is formed.

In addition, in addition to a form supported by the guide rollers 6 and 7 as such, a support member having a rotation shaft may be connected to the end portion of the drum 10 in the X-axis direction via a bearing.

The modeling stage 15 functions as a support member that supports a modeled object which is being formed of the resin material of each layer. The modeling stage 15 is supported by an elevation mechanism 16 to be lifted and lowered. As shown in FIG. 1, the modeling stage 15 and the elevation mechanism 16 are moved by a Y-axis movement mechanism 14 along the Y-axis direction.

The Y-axis movement mechanism 14 includes a movement base 12 having the elevation mechanism 16 mounted, a motor (not shown), and a guide rail 13 which is laid on the base 11 and guides the movement of the movement base 12. The guide rail 13 is laid to have such a length to cover the drum 10 and the ink jet head 30 in the Y-axis direction. The modeling stage 15 can be continuously moved along the Y-axis direction by the Y-axis movement mechanism 14 so as to be disposed below each of the drum 10 and the ink jet head 30.

As shown in FIGS. 1 and 4, the supply nozzle 17 is disposed, for example, in a lower portion of the drum 10 at a position distant from the area A1 having a straight line form. As the supply nozzle 17, a plurality of holes or slits (not shown) for discharging the resin material R is provided along the longitudinal direction. The plurality of holes or slits opens to the drum 10 side.

In a case where the energy ray is light, as the resin material R, a photocurable resin is typically used. As described later, the 3D modeling apparatus 100 according to this embodiment forms a modeled object which is colored, so that a transparent or translucent material, that is, a material which transmits (substantially the entirety or a part of) visible light is used as the resin material R. For example, an acrylic photocurable resin is used. Otherwise, as the resin material R, a white (white or milky white) material may also be used.

As shown in FIG. 3, the illumination mechanism 20 has a laser light source 22, and a polygon mirror 21 which is provided to be rotatable so as to reflect and scan laser light emitted from the laser light source 22. In addition, the illumination mechanism 20 has an optical system 23 which guides the laser light emitted from the laser light source 22 to the polygon mirror 21, and a mirror 24 which reflects the laser light from the polygon mirror 21 to be guided to the slit area S.

The mirror 24 has a long-sized form and is obliquely disposed inside the drum 10 to reflect the scanning light from the polygon mirror 21 downward. As the laser light, a UV laser beam is used. The drum 10 is made of a material that transmits UV light, for example, glass as described above. Laser light UVL illuminates the resin material R in the slit area S outside the drum 10 via the drum 10 from the inside of the drum 10 (see FIG. 7).

In addition, in FIGS. 1, 2, and the like, from among the components of the illumination mechanism 20, only the mirror 24 disposed inside the mirror 10 is illustrated.

The ink jet head 30 functions as a supply mechanism that supplies color ink which is a different material from the resin material R. The ink jet head 30 is a line type head and as shown in FIG. 2 is formed to be long so as to cover a modeling area (an area in which the modeled object is formed) on the modeling stage 15 along the X-axis direction. The ink jet head 30 is connected to an ink tank (not shown). The ink jet head 30 has heads 31 to 34 that discharge pigment inks typically with four colors including C (cyan), M (magenta), Y (yellow), and K (black). The four heads 31 to 34 are arranged along the Y-axis direction, and each of the heads 31 to 34 has a plurality of nozzles (not shown) which are arranged along the X-axis direction and discharge ink. The ink jet head 30 may include a head that discharges white ink or the like, in addition to the four heads 31 to 34.

The ink may be UV-curable ink, as well as the pigment ink.

Although not shown, the 3D modeling apparatus 100 includes drivers which drive a motor inside the elevation mechanism 16, a motor inside the Y-axis movement mechanism 14, a motor that drives the polygon mirror 21, and the laser light source 22. The drivers are connected to a main controller (not shown), and timings and the like of the operation of each unit are controlled by the main controller. In addition, particularly, the main controller controls the driver of the laser light source 22 and the driver of the motor that drives the polygon mirror 21 on the basis of image data of laminated cross-sections stored in a memory or the like (not shown), which constitutes 3D data of an object to be modeled.

Otherwise, a controller which controls each of the units may also be provided.

The drivers or controllers may be configured by hardware, or hardware and software (that is, a computer).

Operations of 3D Modeling Apparatus

Figure 5A:
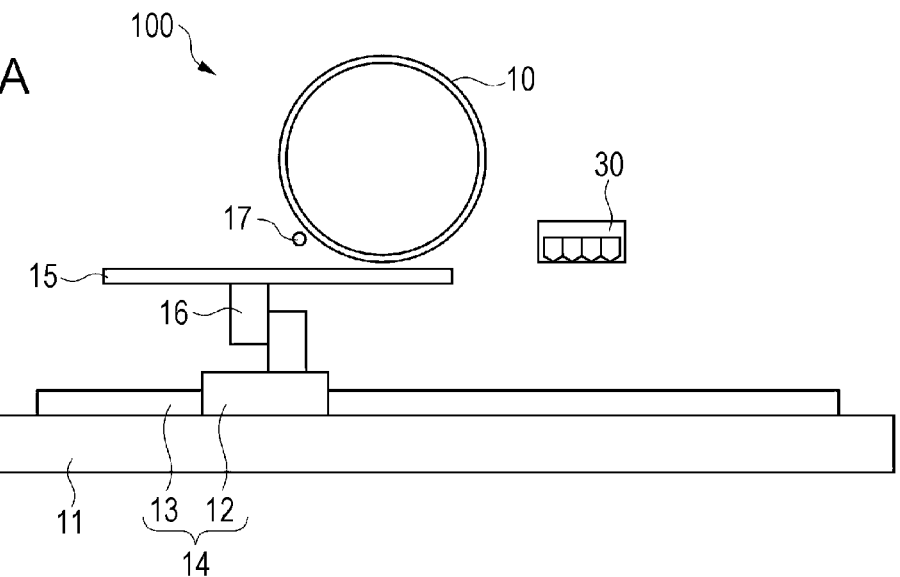
FIGS. 5A to 5C are diagrams sequentially illustrating the operations of the 3D modeling apparatus.
Figure 5B:
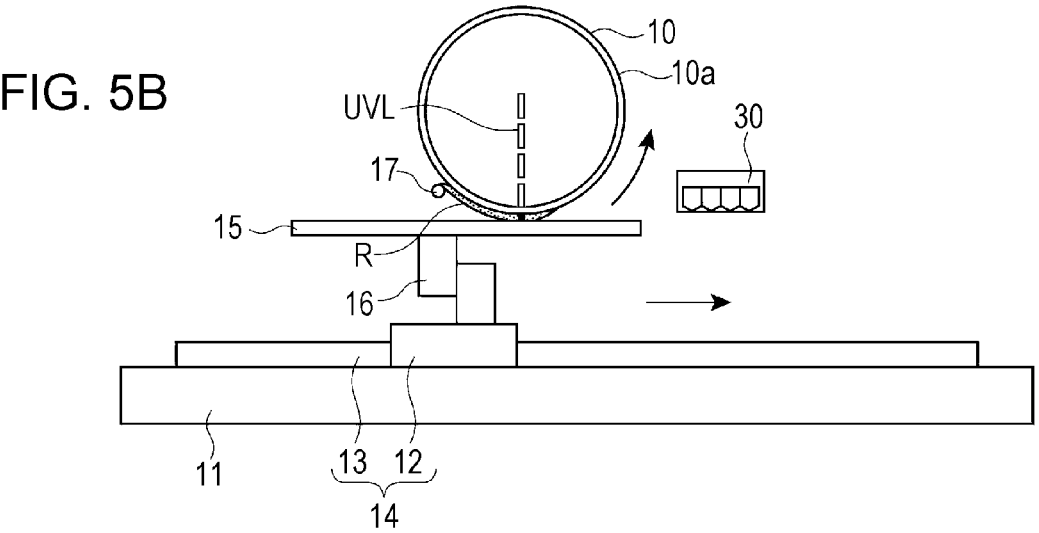
Figure 5C:
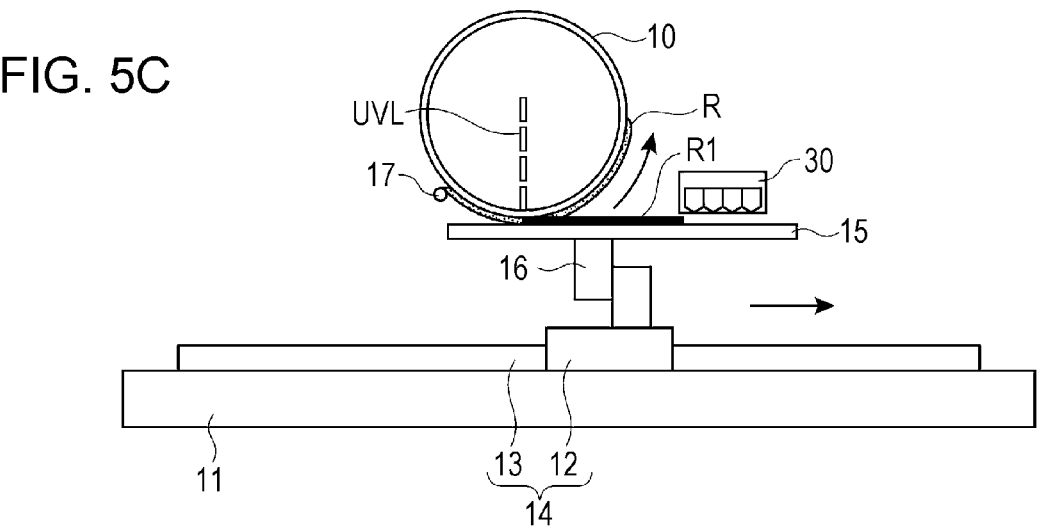

Next, the operations of the 3D modeling apparatus 100 configured as described above will be described. FIGS. 5A to 5C are diagrams sequentially illustrating the operations.

FIG. 5A illustrates a stopped state of the 3D modeling apparatus 100 and illustrates a state where the movement base 12 is at an initial position. Before actually performing modeling, the thickness of a single layer of the cured layers made of the resin material R is set via the main controller. For example, the modeling stage 15 is lifted by driving the elevation mechanism 16. In addition, the height position of the modeling stage 15 when the modeling stage 15 comes into contact with the area A1 having a straight line form which is the lowest portion of the drum 10 is set as the origin in the Z-axis direction.

During setting of the origin, the position of the modeling stage 15 in the Y-axis direction may be appropriately set.

When the origin is set, the modeling stage 15 is lowered by the thickness of the single layer of the resin material R set in advance. The thickness of the single layer of the resin material R is, for example, from 10 μm to 100 μm.

After the modeling stage 15 is lowered, the modeling stage 15 is moved to a modeling start position which is a predetermined position as shown in FIG. 5B by the Y-axis movement mechanism 14. The modeling start position is a position of the modeling stage 15 at which the slit area S can be formed between the modeling stage 15 and the area A1 having the straight line form of the drum 10. Setting of the modeling start position may be appropriately changed by the size of the modeled object to be formed in the Y-axis direction as long as the modeling start position is a position of the modeling stage 15 at which the slit area S can be formed.

When the modeling stage 15 is disposed at the modeling start position, the resin material R in the liquid state is supplied from the supply nozzle 17 to the lower surface side of the drum 10.

When the resin material R is transferred onto the drum 10 in this way, the resin material R flows along the outer peripheral surface 10*a* of the drum 10 under its own weight to the area A1 having a straight line form on the lower side. The state of the slit area S and the vicinity thereof at this time is enlarged and shown in FIG. 7. From this state, illumination of the resin material R with the laser light UVL by the illumination mechanism 20, that is, exposure is started.

The guide roller 6 or 7 (see FIG. 4) may also be configured to be driven by a motor. In a case where the resin material R has a high viscosity and the resin material R does not flow downward under its own weight, the guide roller 6 or 7 is rotated so as to rotate the drum 10 so that a portion to which the resin material R is attached becomes the lowest portion.

As shown in FIG. 5B, the laser light UVL is emitted by the illumination mechanism 20. The laser light UVL generated by the laser light source 22 is scanned by the polygon mirror 21 along the X-axis direction and is incident onto the resin material R of the slit area S via the drum 10. Here, the power of the laser light source 22 is controlled on the basis of the data of a single row of the X-axis direction from the cross-section image data of a single layer of the object to be modeled, so as to selectively expose the area of the resin material R. The exposed area of the resin material R is cured. During exposure by the illumination with the laser light UVL, the drum 10 is stopped.

When exposure of the single row of the resin material R along the X-axis direction is ended, the illumination operation of the laser light is stopped, and the modeling stage 15 is moved by a predetermined pitch to the rear side in the direction along the Y-axis (the right side of FIG. 5B) by the Y-axis movement mechanism 14. In addition, selective exposure of the next single row in the first row (a single row adjacent to the initial single row) is performed in this manner.

The 3D modeling apparatus 100 forms a selective cured layer of the single layer of the resin material, that is, the single layer of the modeled object as shown in FIG. 5C by repeating scanning and illumination of the laser light along the X-axis direction as above and step movement of the modeling stage 15 along the Y-axis direction. The pitch of the intermittent movement of the modeling stage 15 in the direction along the Y-axis is dependent on the spot diameter of the laser beam, that is, the resolution when the modeled object is formed, and the pitch of the movement may be appropriately set.

Figure 8:
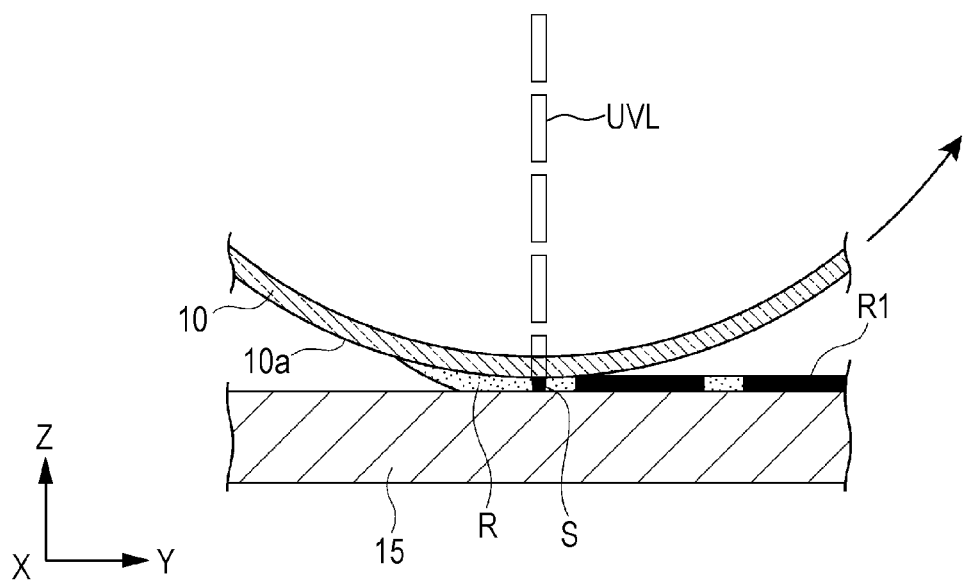
FIG. 8 is an enlarged view showing a resin material R and a cured layer on a modeling stage shown in FIG. 5C.
Figure 9A:
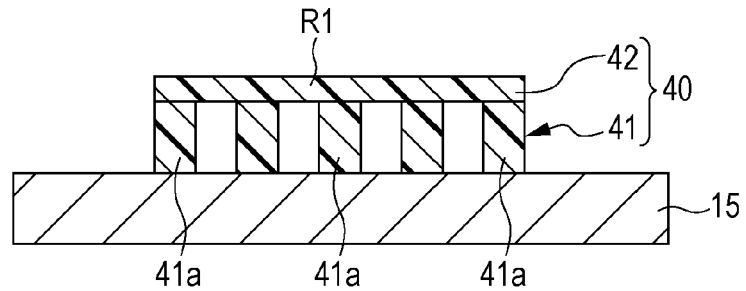
FIGS. 9A to 9E are schematic views sequentially showing the process of forming a modeled object which is colored.
Figure 9B:
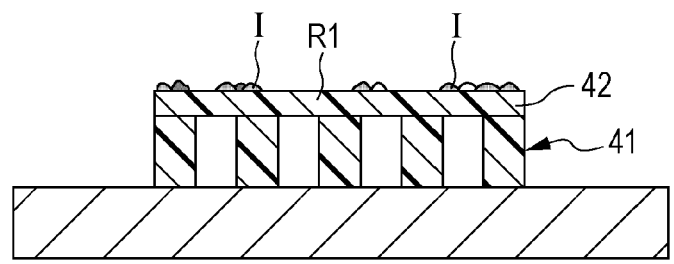
Figure 9C:
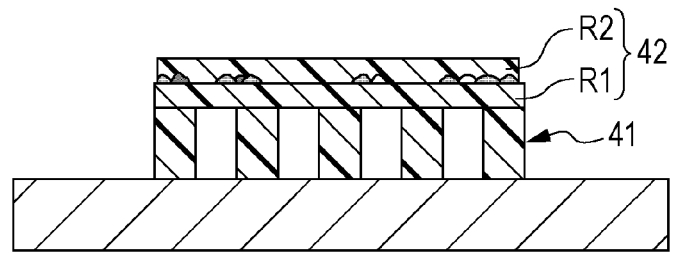
Figure 9D:
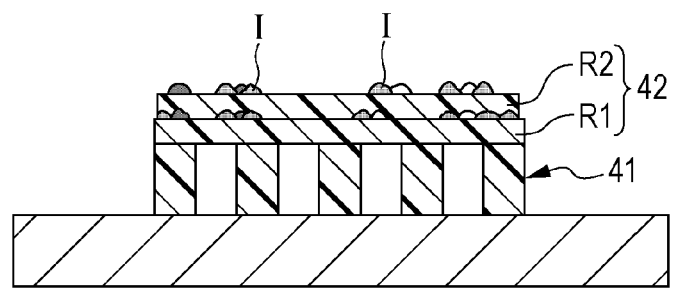
Figure 9E:
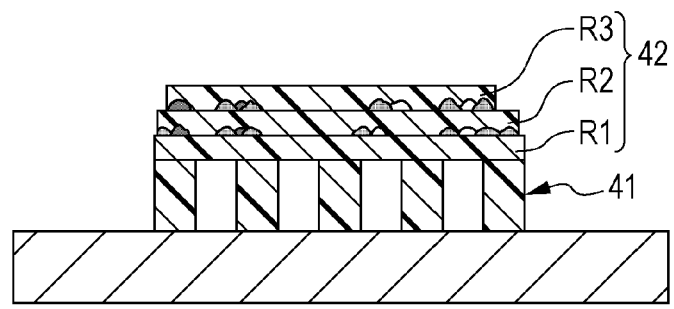

FIG. 8 is an enlarged view showing the resin material R and a cured layer R1 on the modeling stage 15 shown in FIG. 5C. In FIG. 8, the cured layer R1 of the single layer is shown in black.

Here, when exposure of the single row along the X-axis direction is ended and the modeling stage 15 is moved in the direction along the Y-axis by the Y-axis movement mechanism 14, the drum 10 is pulled by the frictional force between the drum 10 and the modeling stage 15 side and is thus rotated counterclockwise in FIG. 8.

When exposure of the single row of the resin material R is ended and the modeling stage 15 is moved by a single predetermined pitch, on the downstream side from the slit area S (for example, on the right side from the slit area in FIG. 7), the modeling stage 15 is moved so that the drum 10 is separated from the modeling stage 15 in the Z-axis direction. Accordingly, the cured layer R1 immediately after being formed (the cured layer attached to the outer peripheral surface 10*a* of the drum 10) is cleanly peeled off from the drum 10.

In this embodiment, the form of the outer peripheral surface 10*a* of the drum 10 has a curved surface (cylindrical surface), and the liquid surface is restricted by the area A1 having a straight line form. Therefore, even though a contractile force generated when the resin material R is cured is exerted on the drum 10, the drum 10 is less likely to be deformed or distorted, and deformation of the drum 10 due to the viscosity of the resin material R before exposure can be prevented. Accordingly, the flatness of the cured layer R1 can be increased and the thickness thereof can be controlled with high precision.

Figure 6A:
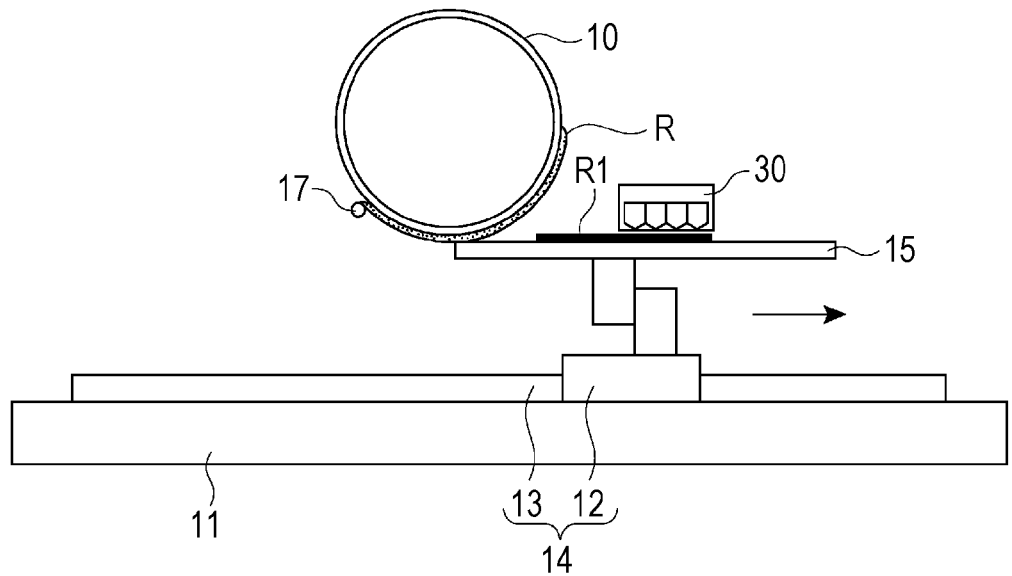
FIGS. 6A and 6B are diagrams sequentially illustrating the operations of the 3D modeling apparatus subsequent to FIGS. 5A to 5C.
Figure 6B:
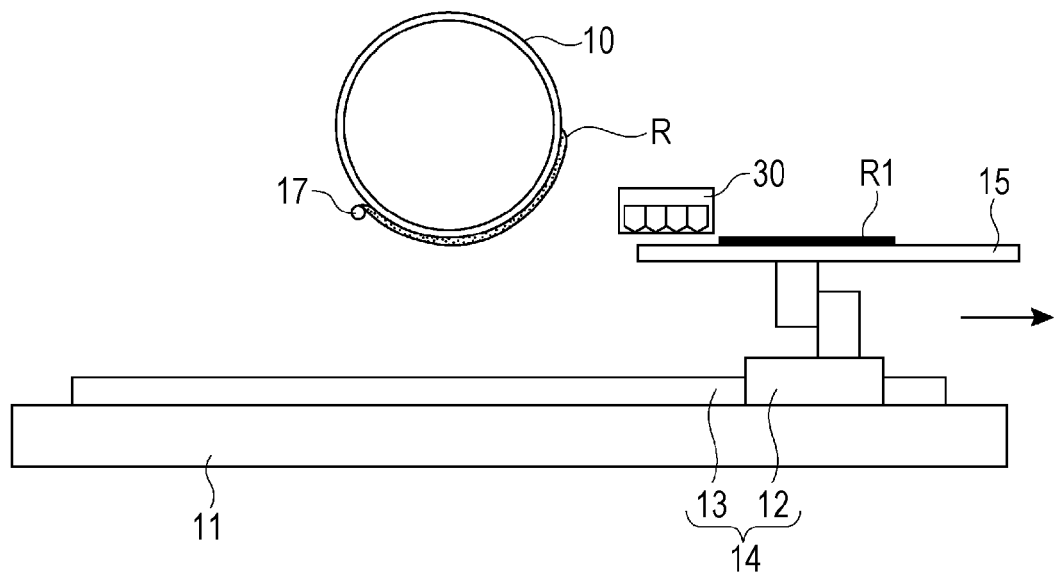

When exposure of the single layer of the resin material R is ended, as shown in FIG. 6A, the cured layer R1 on the modeling stage 15 is moved to a position below the ink jet head 30. In addition, while the modeling stage 15 is moved in the Y-axis direction as it is, color ink is discharged from the ink jet head 30 according to the cross-section image data including color information. The ink is not discharged onto a site other than the cured layer R1, that is, an uncured portion. In this manner, the cured layer R1 is colored to be printed in color.

When discharge of the ink onto the single layer of the cured layer R1 is ended, the modeling stage 15 is returned to its original position and is lowered by the thickness of the single layer by the elevation mechanism 16. In addition, the 3D modeling apparatus 100 sequentially performs the operations of FIGS. 5A to 5C and FIGS. 6A and 6B, thereby forming the second cured layer R1.

By repeating such operations, a modeled body having each layer colored can be formed.

In addition, supplying the resin material R from the supply nozzle 17 may be performed for each exposure of a single layer, each exposure of a plurality of layers, regularly, or constantly.

FIGS. 9A to 9E are schematic views sequentially showing the process of forming a modeled object which is colored by color ink I. In addition, an example in which a modeled object 40 related to this example is configured of a support layer 41 including a plurality of column portions 41*a* and a main body 42 of the modeled object, and the main body 42 is formed to have 3 layers (R1, R2, and R3).

The support layer 41 is detached from the main body 42 of the modeled object after the modeled object is completed. For example, when the lowest surface of the main body 42 is not flat, by forming the support layer 41, the posture of the main body 42 of the modeled object can be supported to be maintained at a constant posture on the modeling stage 15.

Since even the inside of the modeled object 40 formed in this manner is colored, a user can check the color of the inside, for example, when cutting the completed modeled object 40. For example, the modeled object 40 is used as a model of an organ in a medical field (for example, for use in a simulation of surgery or medical education).

Typically, the thickness of the single layer of the resin material R (cured layer) is tens of micrometers and the thickness of a single layer of the ink I is equal to or smaller than 10 μm. Although the layer thicknesses are different, macroscopically, it is seen that the modeled object 40 is entirely colored.

In this embodiment, the form in which ink I is discharged onto each layer to be colored is described. However, an area of a plurality of layers or a random area may be colored as long as the area is an area according to the cross-section image data.

As described above, according to the embodiment, since ink which is a different material from the resin material R that is the main material constituting the modeled object is supplied, the modeled object can be formed within a short time compared to a case where a modeled body is formed of, for example, single layers of UV ink with a small thickness and is then colored like an apparatus according to the related art.

In addition, in this embodiment, other than a powder material used in a powder modeling method, a photocurable resin material, that is, a resin material in a liquid state is used as the main constituent material of the modeled object, so that a high-definition modeled object can be formed.

Second Embodiment

Figure 10:
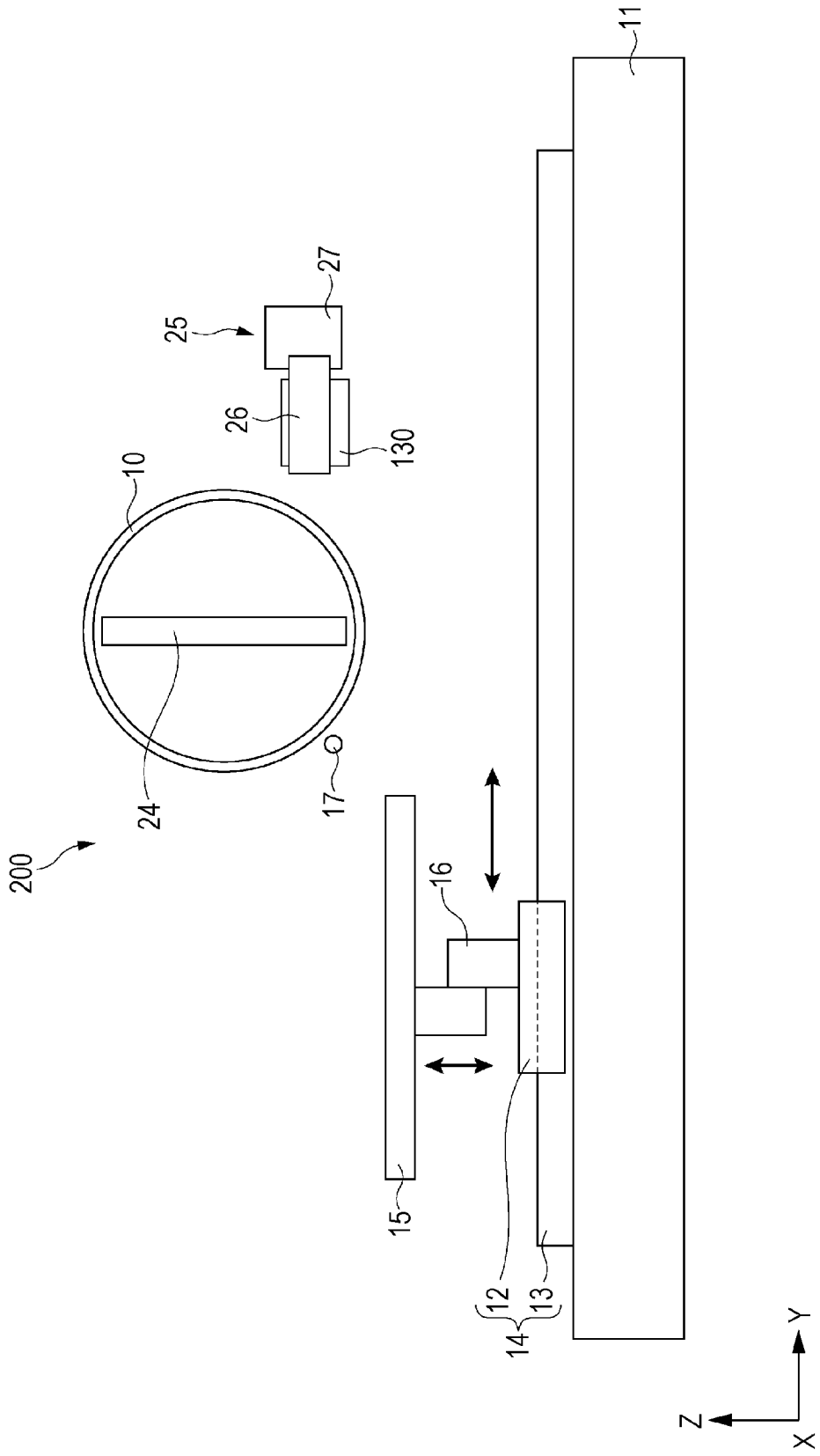
FIG. 10 is a side view showing a 3D modeling apparatus according to a second embodiment of the present disclosure.

FIG. 10 is a side view showing a 3D modeling apparatus according to a second embodiment of the present disclosure. FIG. 11 is a plan view of the 3D modeling apparatus 200 shown in FIG. 10. Description of the same members, functions, and the like included in the 3D modeling apparatus 100 according to the embodiment shown in FIG. 1 and the like is simplified or omitted, and the following description is provided on the basis of the differences.

The ink jet head 30 according to the first embodiment has a line type. An ink jet head 130 according to the second embodiment is of a type scanning in the X-axis direction. That is, the 3D modeling apparatus 200 includes an X-axis scanning mechanism 25 which drives the ink jet head 130 to scan along the X-axis direction. For example, the ink jet head 130 is held by a holder 26, and the holder 26 is connected so as to be movable along a guide portion 27 of the X-axis scanning mechanism 25.

As shown in FIG. 11, in the ink jet head 130, the longitudinal direction of heads 131 to 134 for cyan, magenta, yellow, and black is in the Y-axis direction, and a plurality of discharge nozzles thereof (not shown) is arranged along the Y-axis direction.

Typically, movement of the ink jet head 130 in the X-axis direction and movement of the modeling stage 15 that supports cured layers of a modeled object in the Y-axis direction is alternately repeated, thereby coloring a single layer of the cured layer according to cross-section image data of the single layer. That is, printing is performed in the manner of so-called raster scanning The ink jet head 130 may discharge ink in both directions of a forward path and a return path in the X-axis direction or may discharge ink in any one of the directions.

Third Embodiment

Figure 12A:
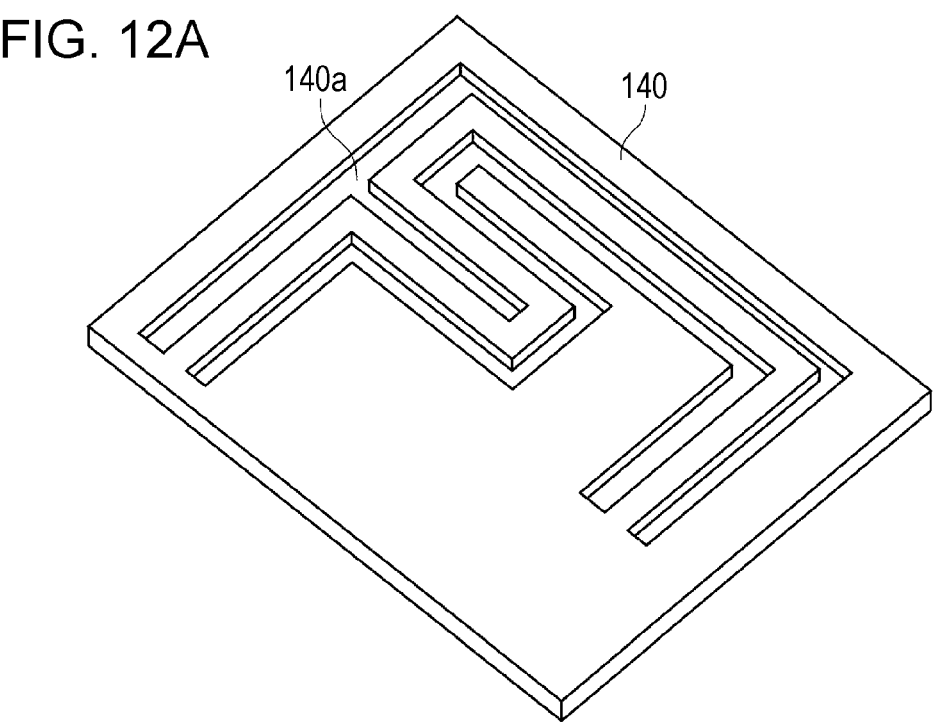
FIGS. 12A and 12B are perspective views showing a modeled object according to another embodiment.
Figure 12B:
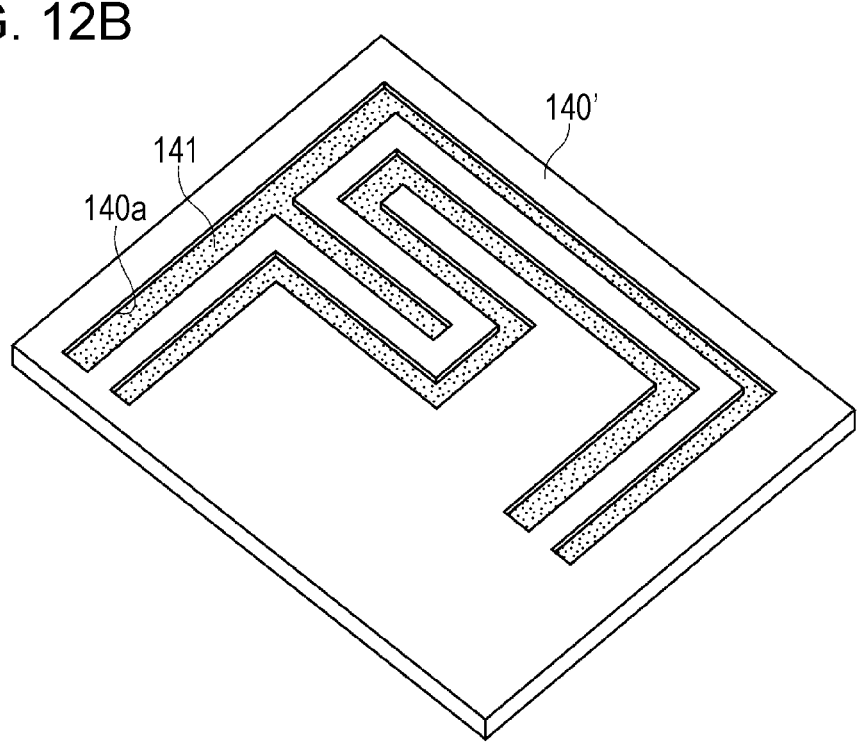

Next, another embodiment of the present disclosure will be described. FIG. 12A shows an example of a modeled object during formation, and FIG. 12B shows an example of a completed modeled object. As shown in FIG. 12A, a modeled object 140 having a flat plate form with a groove 140a in a predetermined pattern is formed of a resin material supplied by the supply nozzle 17 (see FIGS. 1 and 10). As shown in FIG. 12B, a functional material 141 having specific properties that are different from the material of the modeled object 140 having the flat plate form is supplied to the groove 140a. The functional material 141 is, for example, a conductive material. The functional material 141 may also be supplied by a head having the same structure as the ink jet head 30 or 130, or may also be supplied by a supply mechanism having a different structure therefrom.

A modeled object 140' configured as such can be used as an electric circuit device in which the portion of the functional material 141 is a conductive line.

As the functional material 141, there is a magnetic, rubber or the like, hydrophilic, or hydrophobic material besides the conductive material. In addition, this embodiment is not limited to the modeled object having the form shown in FIGS. 12A and 12B.

Fourth Embodiment

Figure 13:
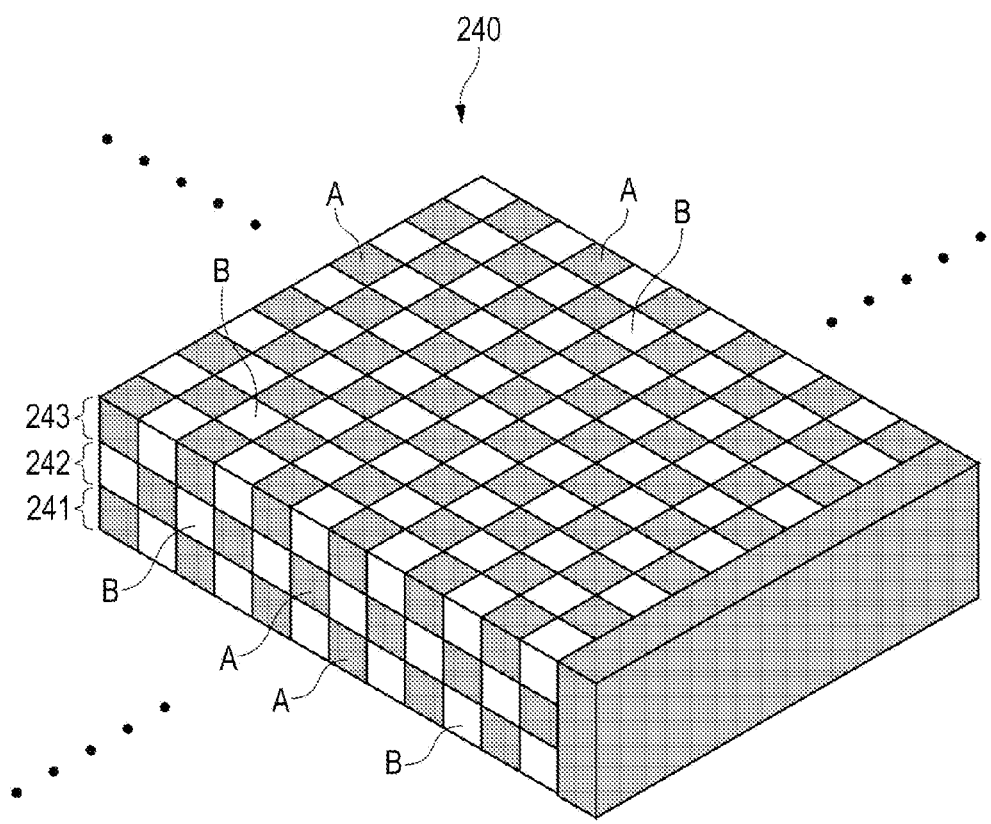
FIG. 13 is a perspective view showing a modeled object according to still another embodiment.

FIG. 13 is a perspective view showing a modeled object according to still another embodiment.

In this modeled object, colored portions A (gray portions in the figure) are alternated layer by layer as viewed in a laminating direction of the resin material (cured layer).

First, in a given first layer 241, only the colored portions A are illuminated with laser light and cured, and onto white portions B, for example, photocurable ink is discharged from the ink jet head. In the subsequent second layer 242 formed adjacent to the first layer configured as such, portions illuminated with the laser light are switched such that light reaches even the area in the first layer 241 to which ink is discharged via the second layer 242 and the ink is cured.

That is, ink is alternately discharged to areas that do not overlap in the laminating direction of the resin material layer by layer, and similarly, the laser light alternately illuminates the areas that do not overlap in the laminating direction of the resin material layer by layer.

In a case where dots in a check pattern formed as such are fine enough, in a macroscopic view, a mixed color of the area to which ink is discharged and the area to which ink is not discharged is seen.

As described above, by performing illumination with the laser light in a so-called interlaced method, two cured layers can be formed by single illumination with the laser light in the laminating direction, so that electrical energy (that is, energy) for driving the laser light per unit volume of a modeled object 240 can be saved.

In this embodiment, instead of ink, a functional material as in the third embodiment may also be used.

Other Embodiments

Embodiments of the present disclosure are not limited to the above-described embodiments, and other various embodiments are realized.

The ink jet heads 30 and 130 are full-color ink jet heads. However, modeled objects may also be colored in monochrome (binary) or a gray scale.

As a supply mechanism that supplies a material for performing printing, in the above embodiments, a non-contact type ink jet head is used. However, as the non-contact type, a sublimation type printing head may also be used. Otherwise, cured layers may also be printed in a contact-type printing method such as a laser printer.

The material of the modeled object is not limited to the photocurable resin material, and materials that are cured by heat energy, electron beams, or ultrasonic waves may also be used. In addition, as the resin material, a material in which a filler having a different refractive index from that of the resin material for a specific wavelength is mixed may also be used.

In addition, the energy ray is emitted from the illumination mechanism 20 to illuminate the resin material may also be appropriately changed. As the energy ray, in addition to UV light, there are infrared light, visible light, electron beams, heat rays, ultrasonic waves, and the like. The heat rays may be infrared light, and in this case, a curing process is performed by spot heating using infrared laser beams. The heat rays, ultrasonic waves, and the like may be used in a case of forming a modeled object with a relatively low modeling precision.

The 3D modeling apparatus according to each of the embodiments may further include a removal mechanism that removes an uncured resin material attached to the cured layers. The removal mechanism may be, for example, an air blower, cleaning using a cleaning liquid, a combination thereof, or the like. The removal mechanism may be provided, for example, between the drum 10 and the ink jet head 30 (or 130) on the movement path of the modeling stage 15 along the Y-axis direction. Otherwise, the removal mechanism may also be provided more on the downstream side than the ink jet head 30 (or 130).

The illumination mechanism is not limited to the embodiments. For example, instead of the polygon mirror 21, a plane mirror may be provided so that the plane mirror drives the laser light source 22 to scan. Otherwise, the illumination mechanism is not limited to the scanning mechanism using the polygon mirror 21, and may also have a light source unit and a mechanism for moving the light source unit to scan in the X-axis direction, which are disposed inside the drum 10.

As the modeling method according to the embodiments, the restriction liquid surface method using the 1D area is used; however, of course, a restriction liquid surface method using a 2D area may also be used. Otherwise, the embodiments are not limited to the restriction liquid surface method and may use a free liquid surface method.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A 3D modeling apparatus comprising:
    a support body which supports a modeled object formed by laminating a resin material that is cured by energy of an energy ray;
    a restriction body positioned to restrict a height of the resin material on the support body;
    an illumination mechanism which cures the resin material by illuminating the resin material through the restriction body with the energy ray, on the basis of image data of laminated cross-sections which constitutes 3D data of an object to be modeled which is an object of modeling, in order to form the modeled object; and
    a supply mechanism which supplies a material that constitutes a part of the modeled object and is different from the resin material, to the resin material that has been cured by the illumination mechanism, on the basis of the cross-section image data.

2. The 3D modeling apparatus according to claim 1, wherein the supply mechanism has an ink jet head that discharges ink as the material different from the resin material in order to color the modeled object.

3. The 3D modeling apparatus according to claim 2, wherein the resin material is a material that transmits visible light or a white material.

4. The 3D modeling apparatus according to claim 1, wherein the supply mechanism supplies a functional material having specific properties as the material different from the resin material.

5. The 3D modeling apparatus according to claim 1, wherein the supply mechanism supplies the material different from the resin material whenever at least a single layer of the resin material is laminated.

6. The 3D modeling apparatus according to claim 1,
    wherein the supply mechanism alternately supplies the material different from the resin material to areas that do not overlap in a laminating direction of the resin material, layer by layer, and
    the illumination mechanism alternately illuminates the areas that do not overlap in the laminating direction of the resin material with the energy ray layer by layer.

7. The 3D modeling apparatus according to claim 1, further comprising:
    a supply nozzle,
    wherein the restriction body has a surface including an area having a straight line form along a first direction and is disposed to face the support body so that the area having the straight line form in the surface becomes closest to the support body,
    wherein the supply nozzle supplies the resin material to a slit area which is an area between the support body side and the area having the straight line form,
    wherein the movement mechanism moves the support body relative to the restriction body along a second direction different from the first direction in order to form a single cured layer of the resin material, and moves the restriction body and the support body relative to each other along the laminating direction in order to laminate the layers of the material cured by the energy ray, and
    wherein the illumination mechanism illuminates the resin material supplied to the slit area by the supply nozzle, with the energy ray via the restriction body.

8. A 3D modeling method comprising:
    restricting a height of a resin material with a restriction body;
    illuminating the resin material through the restriction body with an energy ray on the basis of image data of laminated cross-sections which constitutes 3D data of an object to be modeled which is an object of modeling, thereby selectively curing the resin material according to an area of the resin material; and
    supplying a material that constitutes a part of a modeled object and is different from the resin material, to the resin material that has been cured by the illumination with the energy ray on the basis of the cross-section image data.

9. A modeled object formed by a 3D modeling method which includes:
    restricting a height of a resin material with a restriction body;
    illuminating the resin material through the restriction body with an energy ray on the basis of image data of laminated cross-sections which constitutes 3D data of an object to be modeled which is an object of modeling, thereby selectively curing the resin material according to an area of the resin material; and
    supplying a material that constitutes a part of the modeled object and is different from the resin material, to the resin material that has been cured by the illumination with the energy ray on the basis of the cross-section image data.

* * * * *